(12) United States Patent
Huang (10) Patent No.: US 12,528,132 B2
(45) Date of Patent: Jan. 20, 2026

(54) SOLDER-FREE JOINT AND WELDING METHOD THEREOF

(71) Applicant: SHANGHAI JIAO TONG UNIVERSITY, Shanghai (CN)

(72) Inventor: Zhen Huang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/694,422

(22) PCT Filed: Mar. 23, 2022

(86) PCT No.: PCT/CN2022/082403
§ 371 (c)(1),
(2) Date: Mar. 22, 2024

(87) PCT Pub. No.: WO2023/045288
PCT Pub. Date: Mar. 30, 2023

(65) Prior Publication Data
US 2024/0391009 A1    Nov. 28, 2024

(30) Foreign Application Priority Data

Sep. 24, 2021 (CN) .......................... 202111121534.6
Mar. 14, 2022 (CN) .......................... 202210257863.1

(51) Int. Cl.
*B23K 20/00* (2006.01)
*B23K 1/00* (2006.01)
(Continued)

(52) U.S. Cl.
CPC ............ *B23K 1/203* (2013.01); *B23K 1/0016* (2013.01); *B23K 20/00* (2013.01); *B23K 2101/38* (2018.08); *B23K 2103/12* (2018.08)

(58) Field of Classification Search
CPC ...... H10N 60/01; B23K 1/203; B23K 1/0016; B23K 2101/38; B23K 2103/12;
(Continued)

(56) References Cited

U.S. PATENT DOCUMENTS 3,707,762 A * 1/1973 Bochinski .......... B23K 35/3615
228/262.1
3,964,667 A * 6/1976 Anderson ............ B23K 35/002
228/262.1
(Continued)

FOREIGN PATENT DOCUMENTS

CN          85109182 A      6/1987
CN          87101570 A      12/1988
(Continued)

OTHER PUBLICATIONS

Yeonjoo Park, et al., A superconducting joint for GdBa2Cu3O7_δ-coated conductors, NPG Asia Materials, 2014, pp. 1-5, vol. 6.

*Primary Examiner* — Kiley S Stoner
(74) *Attorney, Agent, or Firm* — Bayramoglu Law Offices LLC (57) ABSTRACT

A solder-free joint and a welding method thereof are provided. The welding method includes the following steps: S1: uniformly coating a flux on a surface of each of a plurality of materials to be soldered, thereby forming a flux layer; S2: performing binding according to the surface of the material, the flux layer, and the surface of the material; and S3: putting the materials into a hot-pressing device, and setting a desired pressure and temperature for soldering. In pretreatment before soldering, the welding method does not add any solder. The obtained solder-free joint has a desirable conductivity and desirable mechanical properties.

5 Claims, 11 Drawing Sheets

(51) Int. Cl.
*B23K 1/20* (2006.01)
*B23K 101/38* (2006.01)
*B23K 103/12* (2006.01)

(58) Field of Classification Search
CPC ........ B23K 1/19; B23K 20/023; B23K 20/24; B23K 2101/36; B23K 20/00–04; Y02E 40/60
USPC ... 228/179.1–180.22, 115–117, 233.1–235.3, 228/3.1, 6.1–6.2, 193–195, 207, 214, 223; 505/300, 926
See application file for complete search history.

(56) References Cited

U.S. PATENT DOCUMENTS

| | | | | |
|---|---|---|---|---|
| 2011/0297433 | A1* | 12/2011 | Kuramoto | H01L 21/6835 428/650 |
| 2015/0021377 | A1* | 1/2015 | Rudd | B23K 35/362 228/198 |
| 2015/0357089 | A1* | 12/2015 | Oh | H10N 60/01 505/410 |
| 2017/0005256 | A1 | 1/2017 | Brice et al. | |
| 2020/0194909 | A1* | 6/2020 | Brittles | H01R 43/16 |
| 2020/0212605 | A1* | 7/2020 | Kanazawa | H10N 60/80 |
| 2021/0184096 | A1* | 6/2021 | Fukushima | H10N 60/0521 |
| 2022/0246329 | A1* | 8/2022 | Ha | H01F 41/04 |
| 2024/0279815 | A1* | 8/2024 | Nasserrafi | B22D 31/005 |

FOREIGN PATENT DOCUMENTS

| | | | | |
|---|---|---|---|---|
| CN | 103170699 | A | | 6/2013 |
| CN | 103433648 | A * | 12/2013 | |
| CN | 104671818 | A | | 6/2015 |
| CN | 104710186 | A * | 6/2015 | |
| CN | 105618967 | A | | 6/2016 |
| CN | 105636719 | A | | 6/2016 |
| CN | 205464859 | U | | 8/2016 |
| CN | 106340381 | A | | 1/2017 |
| CN | 107096994 | A * | 8/2017 | ............ C23C 14/18 |
| CN | 107275471 | A * | 10/2017 | ............ H10N 60/01 |
| CN | 107845713 | A | | 3/2018 |
| CN | 107962320 | A * | 4/2018 | ............ B23K 35/40 |
| CN | 108140715 | A * | 6/2018 | ............... H01F 6/06 |
| CN | 108526640 | A * | 9/2018 | ............ B23K 1/012 |
| CN | 108555428 | A * | 9/2018 | ............ B23K 35/40 |
| CN | 109065256 | A * | 12/2018 | ............ H01B 12/06 |
| CN | 208570204 | U * | 3/2019 | |
| CN | 110867713 | A * | 3/2020 | ............... H01R 4/68 |
| CN | 111009746 | A | | 4/2020 |
| CN | 111524653 | A * | 8/2020 | ........ H01R 43/0228 |
| CN | 113217112 | A * | 8/2021 | ............ F01D 5/141 |
| CN | 113504265 | A * | 10/2021 | ............ G01R 31/00 |
| CN | 113593767 | A * | 11/2021 | ............ H01B 12/06 |
| CN | 113594348 | A * | 11/2021 | ............ H01R 43/02 |
| FR | 2512069 | A1 * | 3/1983 | ............... C23C 2/04 |
| JP | H07135034 | A * | 5/1995 | |
| JP | H07204887 | A * | 8/1995 | ........ B23K 35/3605 |
| JP | 2655332 | B2 * | 9/1997 | |
| JP | 2004291090 | A * | 10/2004 | ........... B23K 26/244 |
| JP | 3771012 | B2 * | 4/2006 | |
| JP | 2007266149 | A * | 10/2007 | |
| JP | 2008066399 | A | | 3/2008 |
| JP | 2008117734 | A * | 5/2008 | |
| JP | 2009016253 | A * | 1/2009 | |
| JP | 2012004029 | A | | 1/2012 |
| JP | 2013107122 | A * | 6/2013 | |
| JP | 2014130730 | A * | 7/2014 | |
| JP | 5695772 | B1 | | 4/2015 |
| JP | 2017117523 | A * | 6/2017 | |
| JP | 2020061255 | A * | 4/2020 | |
| JP | 2020119770 | A * | 8/2020 | |
| KR | 20100015226 | A * | 2/2010 | ........ H10N 60/0268 |
| KR | 20100015228 | A * | 2/2010 | ........ H10N 60/0268 |
| KR | 101466799 | B1 * | 11/2014 | ........ H01R 43/0207 |
| KR | 20210066542 | A * | 6/2021 | ............ H01F 41/048 |
| WO | WO-2021107248 | A1 * | 6/2021 | ............ H01F 41/048 |

* cited by examiner

FIG. 1

* Incomplete structure, to be packaged subsequently

SOLDER-FREE JOINT AND WELDING METHOD THEREOF

CROSS REFERENCE TO THE RELATED APPLICATIONS

This application is the national phase entry of International Application No. PCT/CN2022/082403, filed on Mar. 23, 2022, which is based upon and claims priority to Chinese Patent Applications No. 202111121534.6, filed on Sep. 24, 2021, and No. 202210257863.1, filed on Mar. 14, 2022, the entire contents of which are incorporated herein by reference.

TECHNICAL FIELD

The present disclosure relates to the field of soldering/welding the technical field of (superconducting) tape preparation, and in particular to a solder-free joint and a welding method thereof.

BACKGROUND

Soldering/welding is a process for joining metals or other materials by heating, pressurization, or both. Concerning a method for joining a base metal with a solder, the molten solder will be resolidified into a solid again. This may affect mechanical properties of the base metal sometimes, and makes the solder ineffective in some application scenarios. In some application scenarios, it is desired to remove a metal element in the solder. For example, lead in the tin-lead solder is one of three heavy metal pollutants with a great harm to human bodies, and thus a poorer solder without this element is selected.

With a superconducting tape to be soldered in the superconducting field as an example:

With the development of superconducting magnetic levitation, the fastest land speed has reached 603 km/h. As a key power core, a superconducting magnet is most critical, like an internal combustion engine to vehicles and an engine to aircrafts. Due to factors such as an actual operation scenario and economy, the superconducting magnet often works in a persistent current mode. That is, a power supply is disconnected upon initial excitation, and continuous operation of the superconducting magnet is realized based on a persistent current characteristic. The daily attenuation rate, namely attenuation of a magnetic field every day, is the key indicator. Hence, in actual manufacturing, in addition to a low resistivity, a joint is required to have clean and smooth surface and edge, a desirable overlap ratio between tapes, a good overall curvature, a good axial tensile stress, etc.

Most existing magnetic resonance devices also use a low-temperature superconducting magnet as an excitation element. However, the cryogenic temperature environment is provided by rare and expensive liquid helium, and the low-temperature superconducting magnet with a complex cooling structure has a huge size. If a second-generation high-temperature superconducting tape is used, the magnet will be lighter and smaller. However, the second-generation high-temperature superconducting material cannot be used to produce a long-distance superconducting tape, and the superconducting joint involves an extremely complex and immature process. The superconducting joint of the second-generation high-temperature superconducting tape is presented in the paper 1 (Park Y. Lee M, Ann H, et al. *A Superconducting Joint for GdBa2Cu3O7δ-Coated Conductors* [J]. Npg Asia Materials, 2014, 6(5):e98). Common diffusion joints or lap joints cannot be applied to magnetic resonance magnets due to a large resistivity. In view of this, the low-resistivity joint of the second-generation high-temperature superconducting tape is a key to application in commercial magnetic resonance instruments, and also a striving direction of scientific researchers in the industry.

As a key in superconducting magnet design, the superconducting joint is used to connect an electrical loop, a cooling loop, an insulating layer and the like, and has been widely applied to various large superconducting magnets and relevant supporting devices. A current is redistributed forcibly when flowing through the superconducting joint. Hence, the superconducting joint is required to have a small resistivity, a small alternating-current (AC) loss, a good strength, a simple structure, a desirable process, etc. During research and assembly of the superconducting joint, the superconducting tape at the joint is damaged to some extent to affect a critical current, a direct-current (DC) loss and an AC loss, or even cause irreversible performance degradation of the superconductor. Hence, the joint is considered as a weak link in research of the superconducting magnet. The performance of the joint of the superconducting magnet directly affects research of the whole magnet.

Concerning an existing soldered joint, the molten solder is resolidified and locally stacked, such that a curvature at a certain position of the material is reduced, and the original mechanical properties of the soldered base metal are affected. In coil winding, the soldered joint is damaged easily. In addition, since the joint is bound through a dissimilar metal, with the elapse of time, defects such as cracks and slits are inevitably generated in the alloy to affect the properties of the joint. Hence, how to manufacture a joint with desirable mechanical and electrical properties has become a major demand in this field.

Moreover, the existing joint has a large resistivity. Due to the existence of the solder, mechanical properties of the raw material are affected. Residual soldering tin on the surface of the joint is hard to clean. Cleaning the soldering tin may damage the tape. Moreover, the size and thickness of the raw material are increased, a current near the joint is distributed unevenly in the coil winding. Specifically, the soldered joint with the solder has the following defects: (1) There is a large resistivity. (2) Due to the existence of the solder, mechanical properties at a local position of the raw material are affected. (3) Due to uncertain flowing of the molten solder in pressurization, residual soldering tin on the surface of the solidified solder is hard to clean, and cleaning the soldering tin may damage the tape. (4) The size and thickness of the raw material are increased, a magnetic field near the joint is distributed unevenly in the coil winding after the current is charged. (5) The alloy layer of the dissimilar metal has a poorer binding performance.

Therefore, it is desirable for those skilled in the art to develop a solder-free joint and a welding method thereof.

SUMMARY

In view of the defects in the prior art, an objective of the present disclosure is to provide a solder-free joint and a welding method thereof. A technical problem to be solved by the present disclosure is as follows: While reducing a resistivity of the joint (to a minimum resistivity), the present disclosure achieves a simple and reliable manufacturing process, a low cost, and better mechanical properties (including a mechanical strength, a bending radius, etc.). When used, the whole joint is bent easily, and is not prone to plastic deformation, breakage, and damage to original properties of a base metal. The present disclosure ensures no soldering tin on surfaces of raw materials and between the raw materials, and reduces the size and thickness of the joint (to the minimum size and the minimum thickness).

To achieve the above objective, the present disclosure provides the following technical solutions.

The present disclosure provides a welding method of a solder-free joint, including the following steps:

S1: uniformly coating a flux on a surface of each of pieces of materials to be soldered, thereby forming a flux layer;

S2: performing face-to-face binding on the flux-coated surfaces of the materials, namely performing the binding according to the surface of the material, the flux layer, and the surface of the material; and S3: setting a desired pressure and temperature for hot-pressing soldering.

As an implementation solution, the present disclosure further provides a method for a compression joint, and in particular to a method for manufacturing a solder-free joint of the second-generation high-temperature superconducting coated conductors. The method specifically includes the following steps:

step 1: cutting two superconducting tapes with an appropriate length;

step 2: uniformly coating a viscous substance such as a flux on a surface (superconducting surface) of each of the tapes adjacent to a superconducting layer;

step 3: binding the superconducting surfaces of the two tapes;

step 4: putting the tapes into a hot-pressing device; and step 5: setting a desired pressure and temperature.

As an implementation solution, the superconducting surfaces in step 3 are bound and aligned.

As an implementation solution, pressurization is performed between pressure members of the hot-pressing device to obtain the desired pressure, and heating is performed to obtain the desired temperature; there is no chronological sequence between the pressurization and the heating; and the heating and the pressurization may also be performed simultaneously. The hot-pressing device may be a soldering device; and the pressure members may be independent of the soldering device.

As an implementation solution, whether a pressure and/or time is maintained may be selected in a welding process. The upper pressure member and the lower pressure member may be separated immediately after the pressurization; and the pressure may also be maintained for 3-20 min.

As an implementation solution, the flux is used to remove an oxidation layer on the surface of the material, such that an energy spectrum of Cu2p on the surface of the material contains less than or equal to two peaks. The energy spectrum of the Cu2p on the surface of the material contains less than or equal to two peaks, which indicates that almost all copper elements exist in a form of elemental copper.

As an implementation solution, in step S1, the material may be a superconducting material and/or a conductor with a metal surface and/or an alloy surface and/or a graphite surface, and/or a semiconductor material.

As an implementation solution, when two materials are selected for soldering, the flux may be optionally coated on the surface of one material, or on the surfaces of the two materials in step S1.

As an implementation solution, in step S1, the materials may be wiped with a detergent to remove surface oil stain and dust. The material may be shaped as a tape, a block, a cylinder, and the like.

As an implementation solution, a maximum pressure between the pressure members of the hot-pressing device is generally 800 MPa or below for a superconducting copper plated tape.

As an implementation solution, a maximum temperature is generally 300° C. or below for the superconducting copper plated tape.

As an implementation solution, in step S2, the binding may be complete surface overlap, partial surface overlap, and angle overlap.

As an implementation solution, the desired pressure is 10 MPa or above, preferably 84 MPa to 420 MPa.

As an implementation solution, the desired temperature is 37° C. or above, preferably 190° C. to 260° C.

As an implementation solution, the method is the welding method of the solder-free joint at a temperature of not greater than 260° C.

As an implementation solution, the material is a superconducting tape, a conductor with a metal surface and/or an alloy surface and/or a graphite surface, and/or a semiconductor material.

As an implementation solution, the superconducting tape is a second-generation superconducting tape, with a surface being a copper layer.

As an implementation solution, the surface of the material is a copper layer. The material is a superconducting tape.

As an implementation solution, the method further includes:

S4: slowly separating the upper pressure member and the lower pressure member, and performing cooling; and S5: taking out the solder-free joint.

The present disclosure is best applied to weld the superconducting tape. That is, the solder-free joint of the superconducting tape is merely the best embodiment of the present disclosure, but it is not excluded that other metals and/or graphite materials (including a tape, a block and a cylinder) and/or semiconductor materials are used as a soldering base metal. The solder-free joint of the superconducting tape includes a superconducting tape A, a superconducting tape B, and a flux layer, where a superconducting surface of the superconducting tape A and a superconducting surface of the superconducting tape B are placed in a face-to-face manner; and the flux layer is provided between the superconducting surface of the superconducting tape A and the superconducting surface of the superconducting tape B.

In some embodiments, the superconducting tape A includes a copper layer A, a silver layer A, a substrate layer A, a buffer layer A, a superconducting layer A, a silver layer A, a copper layer A, and a superconducting surface A; the superconducting tape B includes a copper layer B, a silver layer B, a substrate layer B, a buffer layer B, a superconducting layer B, a silver layer B, a copper layer B, and a superconducting surface B; and the superconducting surface A and the superconducting surface B are respectively provided at two sides of the flax layer.

The present disclosure further provides a solder-free joint obtained with the foregoing method.

Compared with the prior art, the present disclosure has the following beneficial effects:

(1) While minimizing a resistivity of the joint, minimizing a process and greatly shortening time, the present disclosure simplifies operation, achieves better mechanical properties including a mechanical strength and a bending radius, ensures no soldering tin on surfaces of raw materials and between the raw materials, and minimizes a size and a thickness. Without a solder, the present disclosure saves the material and protects the environment.

(2) While making a critical current of the superconducting tape unattenuated, the present disclosure can minimize the resistivity. Through test, the resistivity can be not greater than 6 nΩ·cm² (multiplying a resistance of the joint by an actual overlap area between the superconducting surface A and the superconducting surface B). The critical current refers to a current obtained according to 1 μV/cm, That is, when applying the current to the joint, the measured voltage at both ends of the joint exceeds the distance between the voltage leads multiplied by 1 μV/cm in the four-lead test of the welded superconducting joint, and this value of the current called critical current.

(3) The tapes on the joint have a clean surface, without the residual flux. When the soldered joint is wound into a superconducting coil, firm binding is achieved between the tapes, and the whole joint has a desirable curvature.

Figure 8:
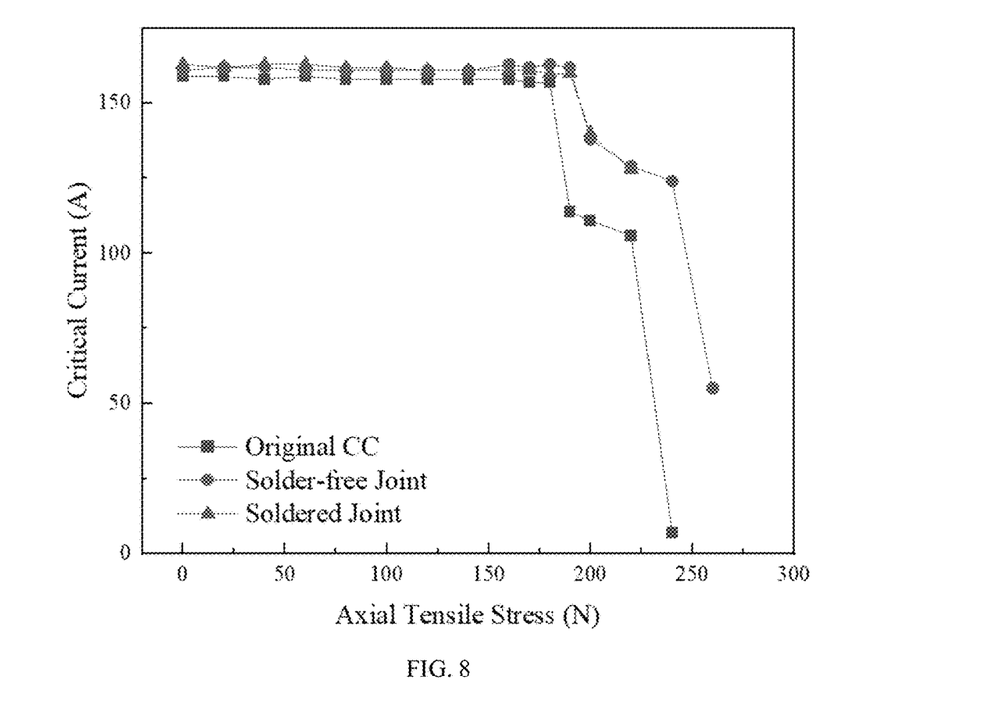
FIG. 8 illustrates experimental results of an original base metal, a solder-free joint and a soldered joint in tensile stress, where the solder-free joint and the soldered joint have a same manufacturing process, the original base metal, the solder-free joint and the soldered joint have a critical tensile stress of about 180 N, and the solder-free joint shows excellent tensile properties.
Figure 9:
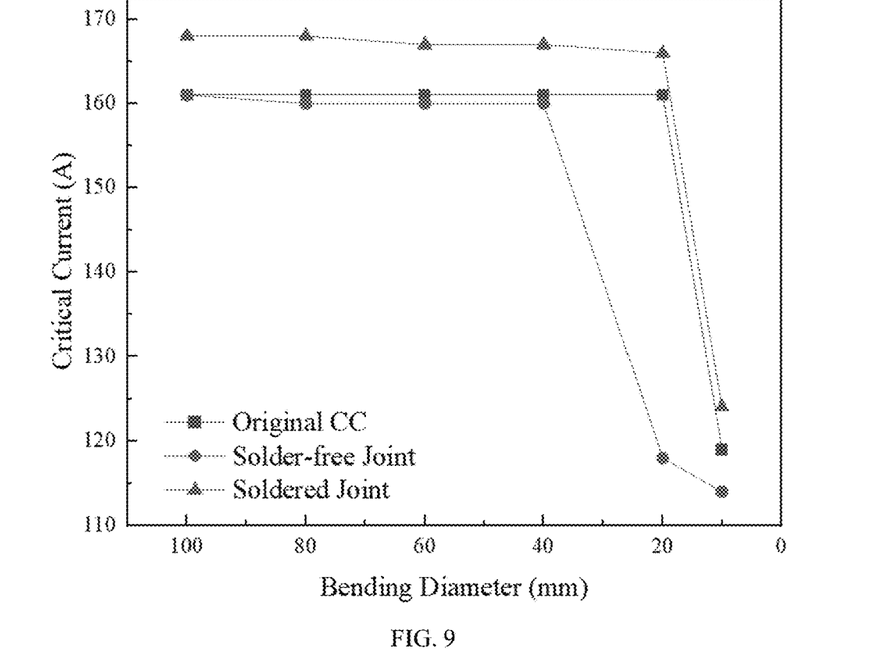
FIG. 9 illustrates experimental results of an original base metal, a solder-free joint and a soldered joint in bending diameter, where the solder-free joint and the soldered joint have a same manufacturing process, the original base metal, the solder-free joint and the soldered joint have a critical bending diameter of 40 mm, and the solder-free joint shows excellent bending properties.

(4) The tested mechanical properties of the joint, including a critical bending radius and a critical axial tensile stress, are desirable. The critical bending radius can be 4 cm or below, and the critical axial tensile stress can be 400 MPa and/or 200 N or above. Tests results are as shown in FIG. 8 and FIG. 9. The so-called critical bending radius refers to that when the superconducting joint is bent and wound under the radius, a critical current retention rate (dividing a critical current under a present test condition by a critical current without any additional test condition) is 95% or above. The so-called critical axial tensile stress refers to that when the tensile stress is applied to two ends of the joint, the critical current retention rate is 95% or above.

Figure 10:
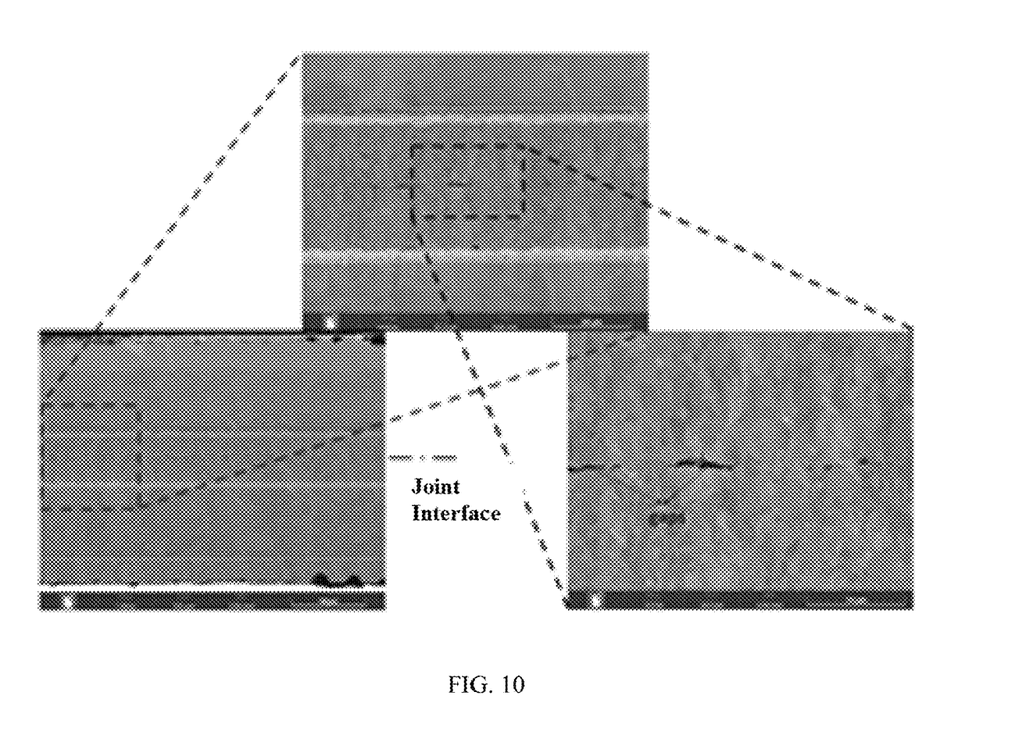
FIG. 10 illustrates an image of a section of a solder-free joint under an SEM, where it can be clearly seen that a tape A and a tape B are bound repeatedly but not continuously, and it is indicated that a copper layer is stably diffused.
Figure 11:
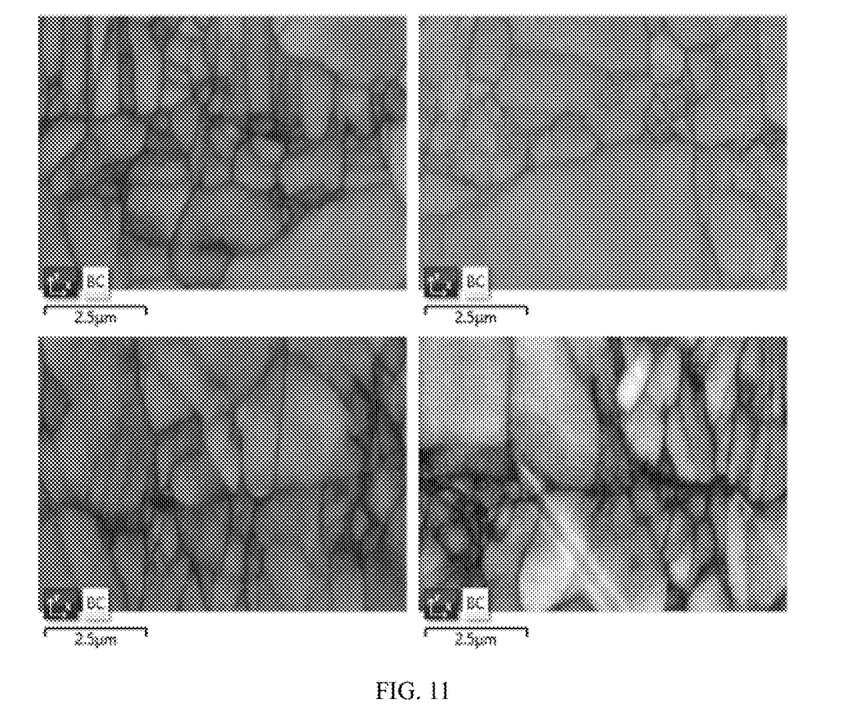
FIG. 11 illustrates an image of a section of a solder-free joint in EBSD under an SEM, where it can be clearly seen that a copper crystal in a copper layer of each of a tape A and a tape B is diffused and bound, and an original contact surface disappears.

(5) Through scanning electron microscopy (SEM) and electron backscatter diffraction (EBSD), it can be clearly observed that the tape A and the tape B are bound by diffusion and crystal grains are fused to each other. The microscopic images are as shown in FIG. 10 and FIG. 11.

BRIEF DESCRIPTION OF THE DRAWINGS

Other features, objectives, and advantages of the present disclosure will become more apparent by reading the detailed description of non-limiting embodiments with reference to the following accompanying drawings.

In the figures: 1: first copper layer, 2: first silver layer, 3: substrate layer, 4: buffer layer, 5: superconducting layer, 6: second silver layer, 7: second copper layer, 8: superconducting surface, 9: flux layer, 10: superconducting tape A, and 11: superconducting tape B.

In the drawings, components with the same structure are denoted by the same numeral, and components with similar structures or functions are denoted by similar numerals. The size and thickness of each component are randomly shown in the drawings, and the present disclosure does not limit the size and thickness of each component. In order to make the illustration clearer, a thickness of a component is appropriately exaggerated in some places of the drawings.

DETAILED DESCRIPTION OF THE EMBODIMENTS

The present disclosure is described in detail below with reference to the embodiments. The following examples will help those skilled in the field to further understand the present disclosure, but do not limit the present disclosure in any way. It should be noted that those of ordinary skill in the art can further make several modifications and improvements without departing from the idea of the present disclosure. These all fall within the protection scope of the present disclosure.

In the embodiment of the present disclosure, materials such as a superconducting tape and a flux (preferably an ET 810L flux) are used. However, the present disclosure is not intended to protect this, but is intended to protect a solder-free hot-pressing method, a compression process and parameters of a hot-pressing device, and a solder-free connecting joint, except the superconducting material in the embodiment, and soldering of other metals.

Figure 1:
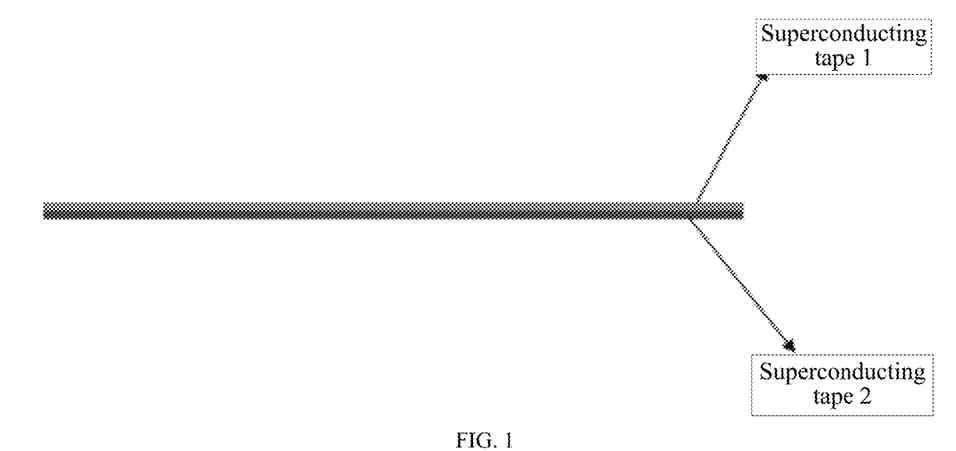
FIG. 1 is a schematic side view after superconducting surfaces of two superconducting tapes are bound before soldering according to Embodiment 1 of the present disclosure.
Figure 2:
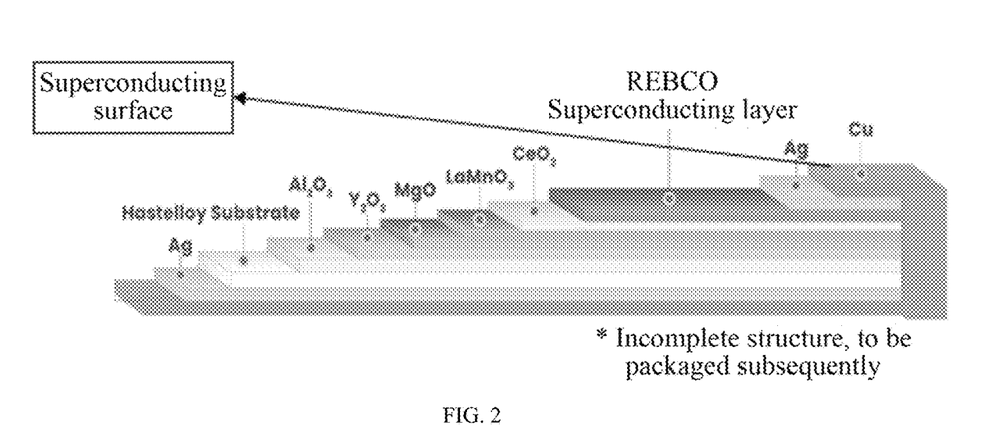
FIG. 2 is a schematic multilayer structural view of a superconducting tape according to Embodiment 1 of the present disclosure.

As shown in FIG. 1 and FIG. 2, a method for compression a solder-free joint specifically includes the following steps: Two superconducting tapes with an appropriate length are cut. A detergent such as alcohol/propanol is used to wipe surface oil stain and dust. A superconducting surface of the superconducting tape 1 and a superconducting surface of the superconducting tape 2 are uniformly coated with a flux (to form a flux layer). The superconducting surfaces of the two tapes are bound together, and are preferably bound and aligned. After the two tapes are put into a compression device, compression parameters including a preset temperature of at least 37° C. and a preset pressure of at least 10 MPa are provided. The tapes can be taken out after compression. A joint between the superconducting tapes is a link for redistributing a current forcibly. That is, the current is flowed from the superconducting layer of the superconducting tape 1 to the superconducting layer of the superconducting tape 2 through a silver layer, a copper layer, (the flux layer, which is omitted in the present disclosure), a copper layer and a silver layer. After the flux layer with a largest resistivity in the joint is removed, the resistivity of the joint can be minimized. Through test, the joint can have the resistivity of 6 $n\Omega \cdot cm^2$. Meanwhile, the tapes on the joint have a clean surface, without the residual flux. When the joint is wound into a coil, the present disclosure ensures firm binding between the tapes, reduces a leakage current and does not generate a local stress. Mechanical properties of the joint such as a bending radius and an axial tensile stress are desirable. The bending radius can be 3 cm or below. The axial tensile stress can be 300 MPa or above.

For more details, refer to the following embodiments:

Embodiment 1

Figure 3:
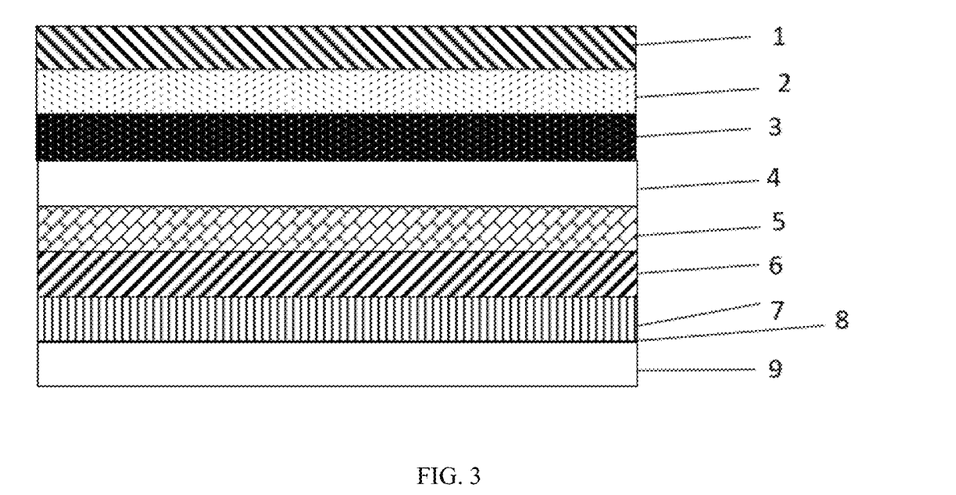
FIG. 3 is a schematic view of a base metal before soldering according to Embodiment 1 of the present disclosure.
Figure 4:
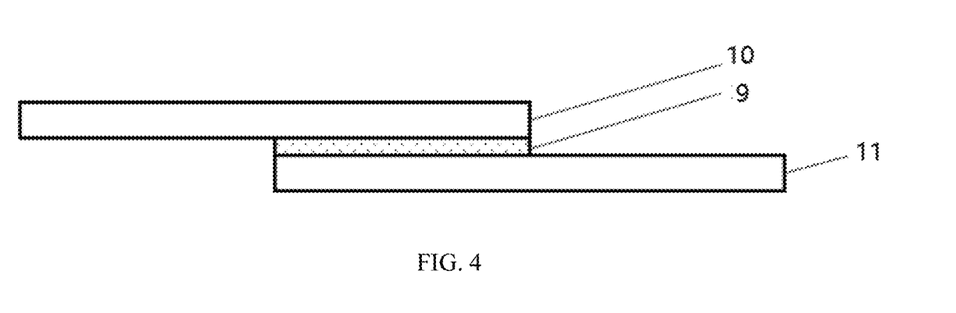
FIG. 4 is a schematic side view of a joint before soldering according to Embodiment 1 of the present disclosure.

The present disclosure provides a solder-free superconducting joint. As shown in FIG. 3 and FIG. 4, before soldered, the solder-free superconducting joint includes an upper tape and a lower tape, namely a superconducting tape A 10 and a superconducting tape B 11.

The superconducting tape A 10 includes first copper layer 1, first silver layer 2, substrate layer 3, buffer layer 4, superconducting layer 5, second silver layer 6, and second copper layer 7. The first copper layer 1 and the second copper layer 7 are 20 μm thick. The first silver layer 2 and the second silver layer 6 are about 1.5 μm thick. The substrate layer 3 is about 50 μm thick. The buffer layer 4 is 0.2-0.3 μm thick. The high-temperature superconducting layer 5 is about 1 μm thick. On a surface of the second copper layer 7, namely, on the superconducting surface 8, a flux ET810L is uniformly coated to form flux layer 9.

The superconducting tape B 11 includes first copper layer 1, first silver layer 2, substrate layer 3, buffer layer 4, superconducting layer 5, second silver layer 6, and second copper layer 7. Each layer of the superconducting tape B is as thick as each layer of the superconducting tape A. On a surface of the second copper layer 7, namely, on the superconducting surface 8, the flux ET810L is uniformly coated to form flux layer 9.

A welding method of the solder-free superconducting joint includes the following steps:

S1: The superconducting tape A and the superconducting tape B with a desired length are taken. A detergent can be used to wipe surface oil stain and dust.

S2: The flux is uniformly coated on the superconducting surface of the superconducting tape A to form the flux layer. The flux is uniformly coated on the superconducting surface of the superconducting tape B to form the flux layer. The superconducting surface of the superconducting tape A and the superconducting surface of the superconducting tape B are bound in a face-to-face manner, and are preferably bound and aligned.

S3: The superconducting tape A, the flax layer, and the superconducting tape B are placed between pressure members on a soldering device.

Figure 5:
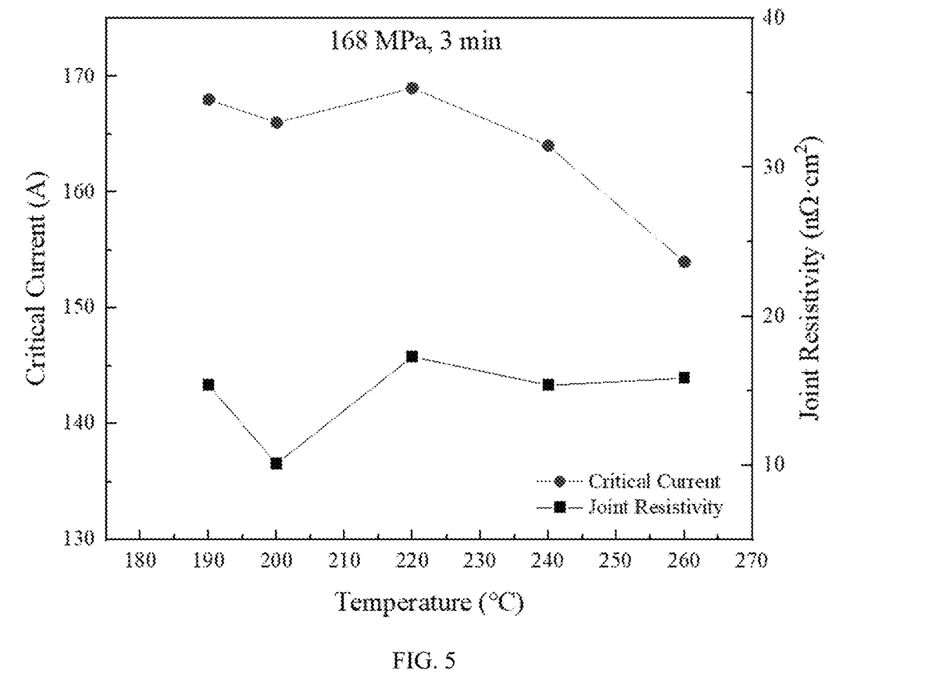
FIG. 5 illustrates a curve between a critical current and a resistivity of a joint from 190° C. to 260° C. in response to a preset pressure of 168 MPa and pressure retention time of 3 min.
Figure 6:
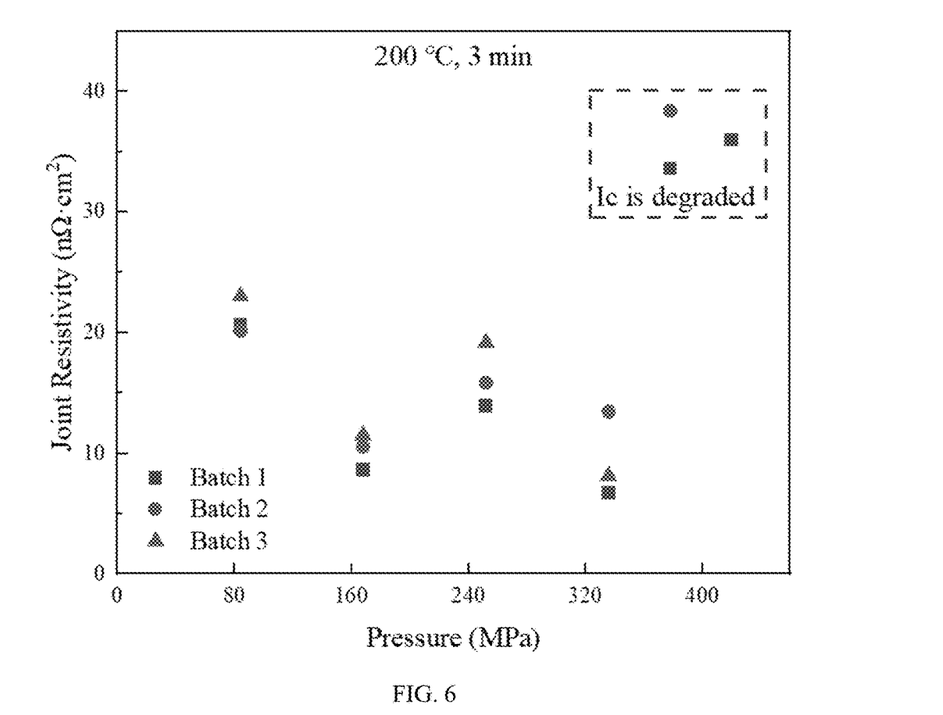
FIG. 6 illustrates a curve of a resistivity of a joint from 84 MPa to 420 MPa in response to a preset temperature of 200° C. and pressure retention time of 3 min.
Figure 7:
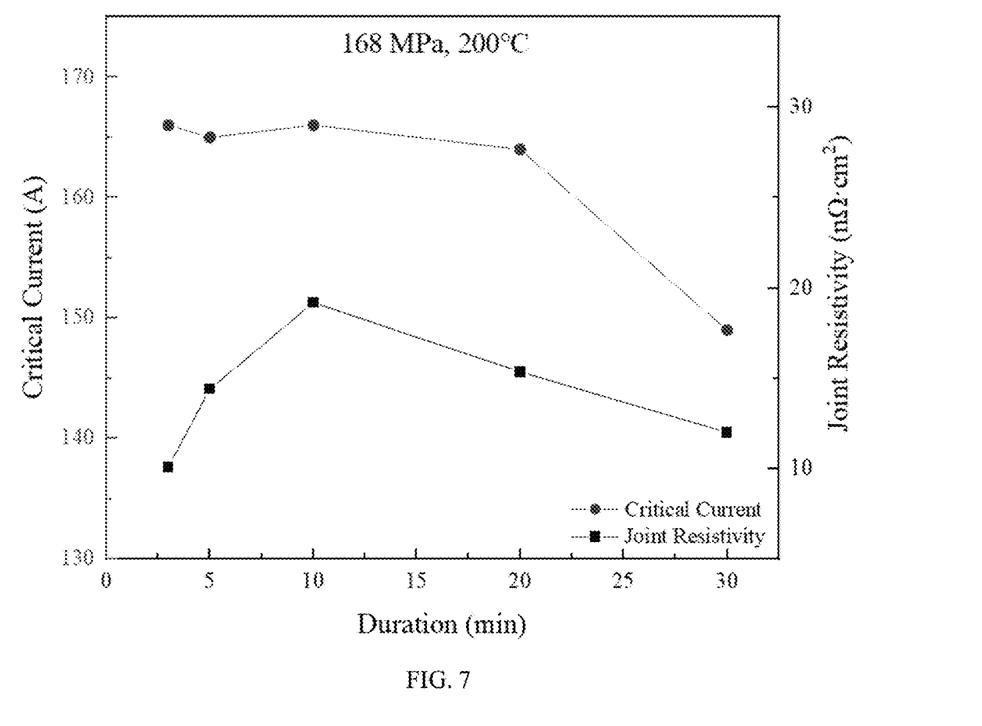
FIG. 7 illustrates a curve between a critical current and a resistivity of a joint from 3 min to 30 min in response to a preset pressure of 168 MPa and a preset temperature of 200° C.

S4: Pressurization is performed between the pressure members in a range from 84 MPa to 420 MPa. Heating is performed to obtain a designed temperature in a range from 190° C. to 260° C. Whether a pressure and/or time is maintained is selected. The time is preferably maintained for 3 min. Influences of the temperature, the pressure and the pressure retention time on a critical current and a resistivity of the joint are as shown in FIG. 5 to FIG. 7. As observed from FIG. 5 to FIG. 7, the superconducting tape can be bound in the temperature from 190° C. to 260° C., the pressure from 84 MPa to 420 MPa, and the pressure retention time from 3 min to 20 min.

S5: The upper pressure member and the lower pressure member are slowly separated, and cooling is performed.

S6: The solder-free joint is taken out.

Figure 12:
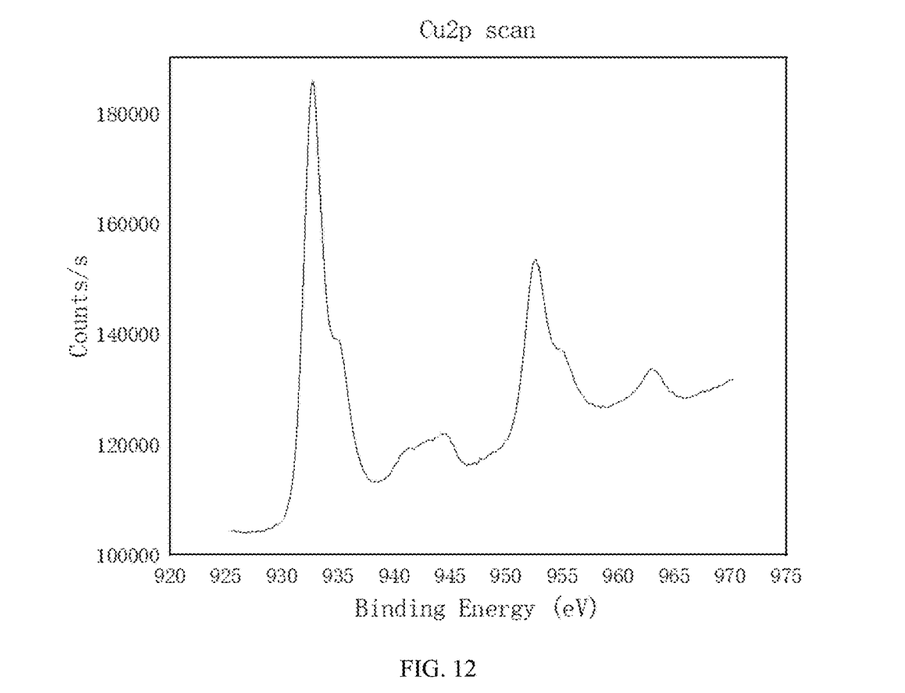
FIG. 12 illustrates an energy spectrum of Cu2p in X-ray photoelectron spectroscopy (XPS) on an untreated surface of a tape, including two peaks with large amplitudes (at 930 eV to 940 eV and 950 eV to 960 eV) and two accompanied peaks with small amplitudes (at 940 eV to 950 eV and 960 eV to 970 eV)
Figure 13:
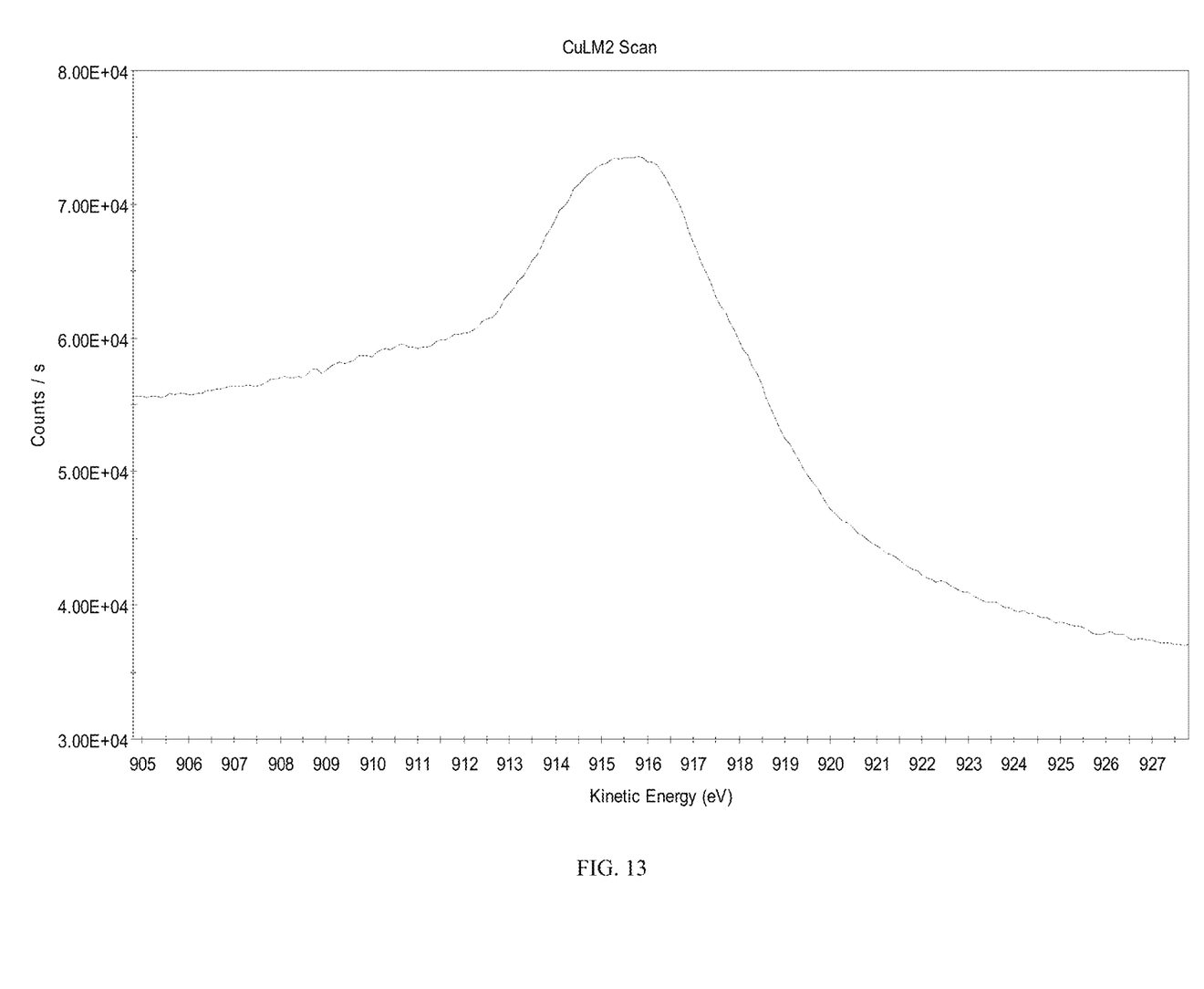
FIG. 13 illustrates an energy spectrum of CuLM2 in XPS on an untreated surface of a tape, this figure and FIG. 12 indicating that the untreated surface of the tape further includes a copper compound such as copper oxide and cuprous oxide except elemental copper.
Figure 14:
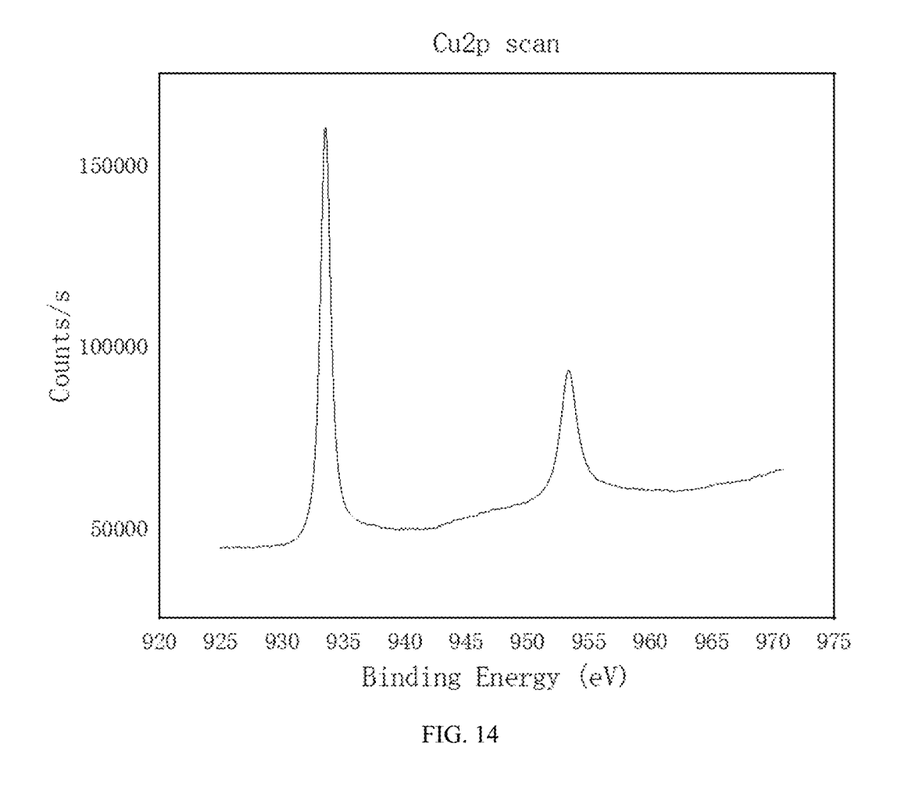
FIG. 14 illustrates an energy spectrum of Cu2p in XPS after an ET810L flux is coated on a surface of a tape, only including two peaks (at 930 eV to 940 eV and 950 eV to 960 eV)
Figure 15:
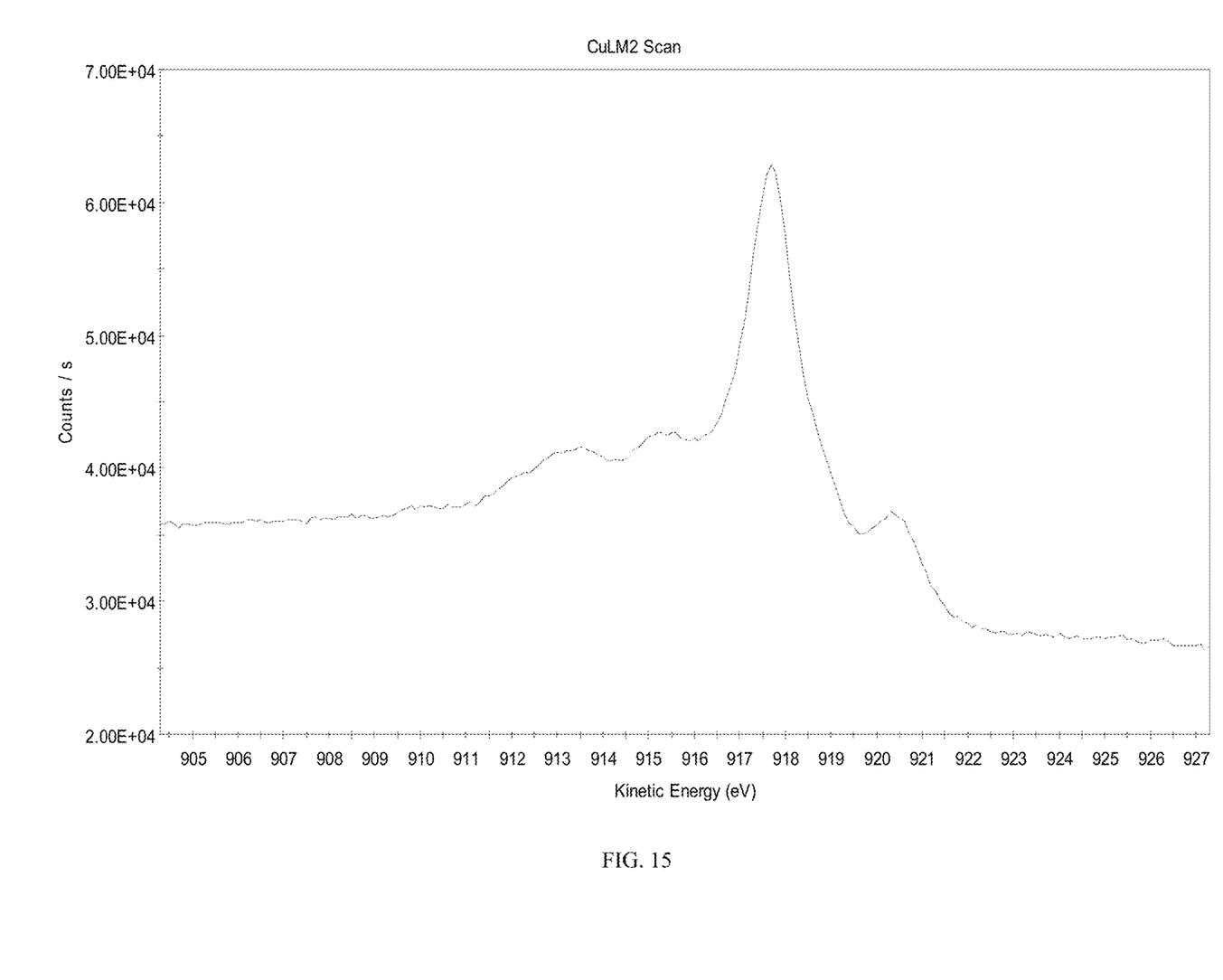
FIG. 15 illustrates an energy spectrum of CuLM2 in XPS after an ET810L flux is coated on a surface of a tape, this figure and FIG. 14 indicating that the surface of the tape almost includes elemental copper.

Through XPS measurement, the XPS energy spectrum only includes two peaks. On the surface of the superconducting tape, there is no Cu—O bond. That is, on the surface of the tape, almost all copper elements exist in a form of elemental copper. It is indicated that the flux performs desirably to remove an oxidation layer on the copper surface. FIG. 8 illustrates experimental results of an original base metal, a solder-free joint and a soldered joint in tensile stress. The solder-free joint and the soldered joint have a same manufacturing process. The original base metal, the solder-free joint and the soldered joint have a critical tensile stress of about 180 N, and the solder-free joint shows excellent tensile properties. FIG. 9 illustrates experimental results of an original base metal, a solder-free joint and a soldered joint in bending diameter. The solder-free joint and the soldered joint have a same manufacturing process. The original base metal, the solder-free joint and the soldered joint have a critical bending diameter of 40 mm, and the solder-free joint shows excellent bending properties. FIG. 10 illustrates an image of a section of a solder-free joint under an SEM. It can be clearly seen that the superconducting tape A and the superconducting tape B are bound repeatedly but not continuously, and the copper layer is stably diffused. FIG. 11 illustrates an image of a section of a solder-free joint in EBSD under an SEM. It can be clearly seen that a copper crystal in a copper layer of each of the superconducting tape A and the superconducting tape B is diffused and bound, and an original contact surface disappears. FIG. 12 illustrates an energy spectrum of Cu2p in XPS on an untreated surface of a tape. FIG. 13 illustrates an energy spectrum of CuLM2 in XPS on an untreated surface of a tape. FIG. 13 and FIG. 12 indicate that the untreated surface of the tape further includes a copper compound such as copper oxide and cuprous oxide except elemental copper. FIG. 14 illustrates an energy spectrum of Cu2p in XPS after an ET810L flux is coated on a surface of a tape. FIG. 15 illustrates an energy spectrum of CuLM2 in XPS after an ET810L flux is coated on a surface of a tape. FIG. 15 and FIG. 14 indicate that the surface of the tape almost includes elemental copper.

Comparative Embodiment 1

The comparative embodiment provides a solder-free superconducting joint. Unlike Embodiment 1, an ALPHA® 9230B flux is used.

In the embodiment, when only the ET810L flux is changed as the ALPHA® 9230B flux, and other materials and methods are the same as those in Embodiment 1, the joint cannot be formed, namely the two tapes are taken out in step S6 in Embodiment 1.

Figure 16:
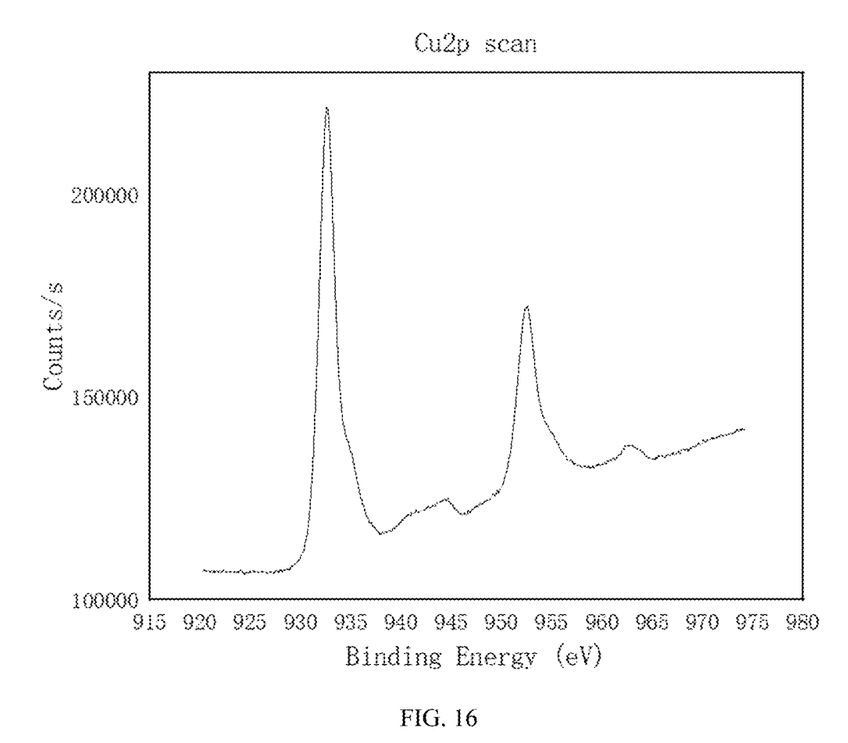
FIG. 16 illustrates an energy spectrum of Cu2p in XPS after an ALPHA® 9230B flux is coated on a surface of a tape, including two peaks with large amplitudes (at 930 eV to 940 eV and 950 eV to 960 eV) and two accompanied peaks with small amplitudes (at 940 eV to 950 eV and 960 eV to 970 eV)
Figure 17:
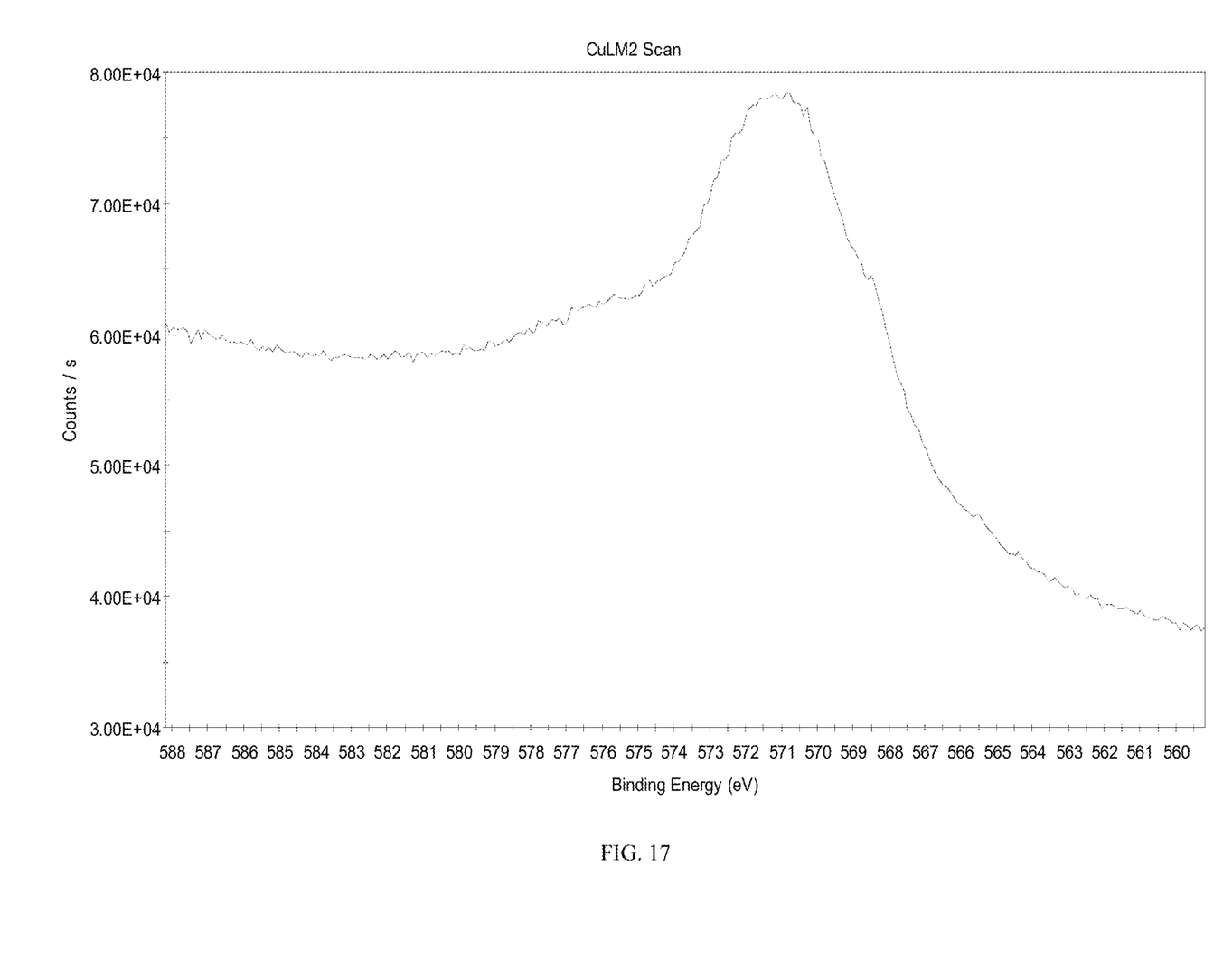
FIG. 17 illustrates an energy spectrum of CuLM2 in XPS after an ALPHA® 9230B flux is coated on a surface of a tape, this figure and FIG. 16 indicating that the surface of the tape further includes a copper compound except elemental copper.

FIG. 16 illustrates an energy spectrum of Cu2p in XPS after an ALPHA® 9230B flux is coated on a surface of a tape. FIG. 17 illustrates an energy spectrum of CuLM2 in XPS after an ALPHA® 9230B flux is coated on a surface of a tape. FIG. 17 and FIG. 16 indicate that the surface of the tape further includes many copper compounds except elemental copper.

The foregoing is detailed description of the preferred specific embodiments of the present disclosure. It should be understood that a person of ordinary skill in the art can make various modifications and variations according to the concept of the present disclosure without creative efforts. Therefore, all technical solutions that a person skilled in the art can obtain based on the prior art through logical analysis, reasoning, or finite experiments according to the concept of the present disclosure shall fall within the protection scope defined by the appended claims.

What is claimed is:

1. A welding method of a solder-free joint, comprising the following steps:
    step 1: cutting two superconducting tapes with an appropriate length, wherein each superconducting tape is a second-generation superconducting tape, with a surface being a copper layer;
    step 2: coating a flux on a superconducting surface of each of the two superconducting tapes, wherein the flux is used to remove an oxidation layer on the surface of each of the materials, such that an energy spectrum in X-ray photoelectron spectroscopy (XPS) of Cu2p on the surface of each of the materials contains less than or equal to two peaks, and the superconducting surface is adjacent to a superconducting layer;
    step 3: binding the superconducting surfaces of the two superconducting tapes;
    step 4: putting the two superconducting tapes into a hot-pressing device; and
    step 5: setting a desired pressure and a desired temperature.

2. The welding method according to claim 1, wherein the superconducting surfaces are bound and aligned in step 3.

3. The welding method according to claim 1, wherein pressurization is performed between pressure members of the hot-pressing device to obtain the desired pressure, and heating is performed to obtain the desired temperature; there is no chronological sequence between the pressurization and the heating; and the heating and the pressurization are also allowed to be performed simultaneously.

4. The welding method according to claim 1, wherein the desired pressure is 84 MPa to 420 MPa, and the desired temperature is 190° C. to 260° C.

5. The welding method according to claim 1, wherein the less than or equal to two peaks are at 930 eV to 940 eV and/or 950 eV to 960 eV.

* * * * *